United States Patent Office 3,458,333
Patented July 29, 1969

3,458,333
CROSS-LINKING AGENT FOR METHYL-HYDROGEN SILOXANE IMPREGNATING COMPOSITIONS
Karl Schnurrbusch, Cologne-Flittard, Hans-Horst Steinbach, Leverkusen-Mathildenhof, and Otto Weiden, Leverkusen, Germany, assignors to Farbenfabriken Bayer Aktiengesellschaft, Leverkusen, Germany, a corporation of Germany
No Drawing. Filed Sept. 14, 1967, Ser. No. 667,676
Claims priority, application Germany, Oct. 6, 1966, F 50,371
Int. Cl. C08h 17/62; D06m 15/08
U.S. Cl. 106—287                                6 Claims

ABSTRACT OF THE DISCLOSURE

The activity of cross-linking agents for methyl-hydrogen polysiloxanes in aqueous emulsion is inhibited by dissolving these agents in a water-immiscible inert solvent and emulsifying the resulting solution with water in the presence of a customary emulsifier. A mixture of an emulsion thus obtained, with an emulsion of organo-polysiloxanes at least part of which contains silicon-bonded hydrogen atoms is sufficiently stable not to give flakes or gels during storage. When such a mixture is utilized for impregnation of fabrics cross-linking of the polysiloxanes occurs upon drying.

---

This invention relates to the production of aqueous emulsions of textile-hydrophobing agents which contain as essential component a methyl-hydrogen polysiloxane which is cross-linked on the textile materials by the action of a heavy metal compound at higher temperatures. The invention is especially concerned with the production of a novel cross-linking composition for use in such agents.

The impregnation of textile materials with hydrophobing agents containing methyl-hydrogen polysiloxanes and cross-linking metal compounds is known. For example, in the journal "Melliand Textilberichte," volume 43 (1962), pages 1089 to 1091, there is described, inter alia, a hydrophobing process in which ziroconium salts are used as the metal compound. However, the finish of synthetic fibres obtained thereby gave rise to dyeings having too low a resistance to rubbing.

It is also known that the cross-linking of organo polysiloxanes is very substantially assisted by certain organic metal compounds, particularly tin compounds, and especially alkyl tin carboxylates. However, it has hitherto not been possible to combine these cross-linking agents with aqueous methyl-hydrogen siloxane emulsions to give sufficiently stable impregating liquors, since their activity leads to the formation of flakes and gels in the liquor, even before the fabric is finished.

We have now found that it is possible temporarily to inhibit the activity of such organic metal compounds and to such an extent that satisfactorily stable liquors are obtained and the high activity of the cross-linking agent develops only upon drying the impregnated fabric.

According to the invention the cross-linking system for an organopolysiloxane impregnating liquor is an aqueous emulsion containing an aqueous solution of a known emulsifier and a solution of an organic heavy metal compound capable of cross-linking organo-polysiloxane resins in a water-immiscible inert solvent, the inert solvent being present in an amount of 30 to 70 percent by weight, based on the weight of solution, and 10 to 30 percent by weight, based on the weight of the emulsion.

The organic heavy metal compounds for use as the curing or cross-linking agents include, for example, lead naphthenate, zinc-2-ethyl-hexoate and iron-acetyl-acetonate, but preferably they are tin compounds, such as tin octoate, dioctyl-tin-maleate, dibutyl-tin-dilaurate, dibutyl-tin-diacetate and dibutyl-tin-di-2-ethyl-hexoate.

Suitable water-immiscible inert solvents are, for example, xylene, toluene, benzene and methylene chloride. For the preparation of the cross-linking emulsion, the simplest method of operation involves first dissolving the heavy metal compound in the solvent and then emulsifying this solution together with one of the usual emulsifiers, e.g. a non-ionic polyether, in the calculated amount of water.

When the mixing proportions are kept within the stated limits, a stable cross-linking emulsion is obtained; when this is mixed with the polysiloxane emulsion there results an unobjectionable stable liquor for impregnating a fabric. The solvent inhibits the cross-linking action of the metal compounds in aqueous emulsion to such an extent that no reaction can be observed in the impregnating liquor. Only upon drying of the fabric impregnated with such a liquor does the cross-linking take place, and then it proceeds so rapidly that a further heat treatment is unnecessary. Such further heat treatment, e.g., lasting some minutes at a temperature up to 150° C., has to be carried out, according to page 1091 of the above-mentioned publication, if instead of the rapidly acting metal compound an epoxy resin precondensate is used as the cross-linking agent.

Impregnating emulsions which contain methyl-hydrogen siloxanes, and for which the cross-linking emulsions of the invention may be used, are well known and customary in the industry; in this respect see, for example, U.S. Patents Nos. 2,588,365; 2,588,366; 2,807,601 and 3,306,759.

The following examples are given for the purpose of illustrating the invention.

EXAMPLE 1

An aqueous emulsion containing 40 percent by weight siloxane is obtained, similarly to Example 1 of U.S. Patent No. 3,306,759, by emulsifying a mixture of 200 g. $\alpha,\omega$-dihydroxy-polydimethyl siloxane of 1000 cst. viscosity (at 20° C.) and 200 g. $\alpha,\omega$-bis-(trimethylsiloxy)-poly-(methyl-hydrogen-siloxane) of 20 cst. viscosity (20° C.) in a solution of 1.5 g. glycine and 8.5 g. cetyl-benzyl-dimethyl-ammonium chloride in 590 g. water by conventional means.

The emulsion of the cross-linking accelerating agent is prepared in the following manner: 400 g. di-n-octyl-tin-maleate are dissolved in 200 g. toluene, and this solution is emulsified by means of one of the customary emulsifying devices in a solution of 20 g. of an oleyl-polyglycol ether, commercially available as an emulsifier, in 370 g. water. A thickly liquid, white, stable cross-linking emulsion is obtained From the two emulsions so obtained an impregnating liquor is prepared by dissolving 2 g. ammonium acetate in 1 litre water followed by admixing 50 g. of the siloxane emulsion and 5 cm.$^3$ of the cross-linking emulsion.

For testing, a mixed fabric of cotton and polyester was impregnated with this liquor after standing for more than 24 hours, squeezed off and dried in the air at 110° C. The water absorption of the fabric, determined according to the well known "Bundesmann Method," amounted to 4.3 percent by weight, and the dripping off time was 10 minutes.

For comparison, a liquor was prepared in an analogous manner and differed from the liquor described above only in that the toluene was replaced by an equivalent quantity by weight of water. Thus, 20 g. of the same oleyl polyglycol ether were dissolved in 570 g. water, and 400 g. of the same tin compound were dispersed therein by means of the same emulsifying device. Impregnating liquors prepared with this emulsion in the stated manner exhibited small gel knots even after standing for only 24 hours, and were, therefore, useless.

EXAMPLE 2

300 g. zinc octoate are dissolved in 300 g. methylene chloride, and this solution is emulsified for the preparation of a cross-linking emulsion with 20 g. emulsifier and 370 g. water as described in Example 1. The procedure for preparing the impregnating liquor is also as described in Example 1.

A test carried out in an analogous manner to that of Example 1 resulted in 5.1 percent by weight water absorption and 10 minutes dripping off time.

EXAMPLE 3

200 g. lead naphthenate are dissolved in 200 g. xylene and this solution is emulsified with 20 g. of the emulsifier and 580 g. water in analogy with the preceding examples.

Testing of the impregnating liquor prepared and used as above resulted in 6% by weight water absorption and 10 minutes dripping off time.

What is claimed is:

1. An aqueous emulsion composed of an aqueous solution of a non-ionic emulsifier wherein said emulsifier is a polyether and a solution of an organo-polysiloxane cross-linking agent selected from the group consisting of tin carboxylate, diorgano tin carboxylate, lead carboxylate, iron carboxylate and zinc carboxylate, in a water immiscible inert solvent selected from the group consisting of xylene, toluene, benzene and methylene chloride, said inert solvent being present in an amount of 30 to 70% by weight referred to the weight of the solution and 10 to 30% by weight referred to the weight of the emulsion.

2. An aqueous emulsion according to claim 1 wherein said organo-polysiloxane cross-linking agent is a member selected from the group consisting of zinc octoate, lead napthenate, zinc-2-ethyl-hexoate and iron-acetyl-acetonate.

3. An aqueous emulsion according to claim 1 wherein said organo-polysiloxane cross-linking agent is a member selected from the group consisting of tin octoate, dioctyltin maleate, dibutyltin dilaurate, dibutyltindiacetate and dibutyltin-di-2-ethylhexoate.

4. An aqueous emulsion according to claim 3 wherein said polyether is oleyl-poly-glycol ether.

5. An impregnating liquor for the finishing of textiles comprising an aqueous emulsion of a methyl-hydrogen poly-siloxane in admixture with an emulsion according to claim 1, wherein said organo-poly-siloxane cross-linking agent being present in an amount of about 5 to 10% by weight referred to the amount of polysiloxane present in said impregnating liquor.

6. A process for finishing textile materials comprising impregnating a textile material with a liquor according to claim 5 and drying the thusly impregnated material.

References Cited

UNITED STATES PATENTS

| | | | |
|---|---|---|---|
| 2,927,870 | 3/1960 | Beutler | 117—138.5 |
| 3,239,411 | 3/1966 | Leebrick | 117—138.5 |
| 3,098,833 | 7/1963 | Solomon. | |
| 3,305,502 | 2/1967 | Lampe. | |
| 3,382,193 | 5/1968 | Cuthill | 260—18 X |

JULIUS FROME, Primary Examiner

T. MORRIS, Assistant Examiner

U.S. Cl. X.R.

117—138.5; 252—311; 260—18, 29.2